United States Patent
Singh et al.

(10) Patent No.: US 9,131,477 B2
(45) Date of Patent: Sep. 8, 2015

(54) METHOD AND APPARATUS FOR RADIO RESOURCE CONTROL PROCEDURES

(75) Inventors: Ajay Singh, Waterloo (CA); Noushad Naqvi, Waterloo (CA); Vaibhav Singh, Birmingham (GB); Anup Vijay, Wednesbury (GB); Anthony William Tod, St Agatha (CA)

(73) Assignee: BlackBerry Limited, Waterloo, Ontario (CA)

(*) Notice: Subject to any disclaimer, the term of this patent is extended or adjusted under 35 U.S.C. 154(b) by 137 days.

(21) Appl. No.: 13/489,820

(22) Filed: Jun. 6, 2012

(65) Prior Publication Data
US 2013/0003523 A1 Jan. 3, 2013

Related U.S. Application Data

(60) Provisional application No. 61/493,826, filed on Jun. 6, 2011.

(51) Int. Cl.
| | | |
|---|---|---|
| *H04W 76/02* | (2009.01) | |
| *H04L 1/18* | (2006.01) | |
| *H04W 76/06* | (2009.01) | |
| *H04W 76/04* | (2009.01) | |
| *H04L 1/00* | (2006.01) | |
| *H04L 1/16* | (2006.01) | |
| *H04L 12/801* | (2013.01) | |
| *H04W 36/06* | (2009.01) | |

(Continued)

(52) U.S. Cl.
CPC ........... *H04W 76/028* (2013.01); *H04L 1/1867* (2013.01); *H04W 76/021* (2013.01); *H04W 76/026* (2013.01); *H04W 76/064* (2013.01); *H04W 76/068* (2013.01)

(58) Field of Classification Search
CPC . H04W 28/04; H04W 76/028; H04W 76/046; H04W 76/064
USPC ................. 370/216, 352–358; 455/67.11, 423
See application file for complete search history.

(56) References Cited

U.S. PATENT DOCUMENTS

| | | | | |
|---|---|---|---|---|
| 7,016,321 | B1 * | 3/2006 | Park et al. ..................... 370/331 |
| 7,209,747 | B2 * | 4/2007 | Chen ............................. 455/450 |
| 2001/0018342 | A1 * | 8/2001 | Vialen et al. .................. 455/423 |

(Continued)

FOREIGN PATENT DOCUMENTS

EP          1689130 A1     8/2006

OTHER PUBLICATIONS

PCT International Search Report issued in copending application No. PCT/EP2012/060757 dated Sep. 12, 2012, 17 pgs.

(Continued)

*Primary Examiner* — Un C Cho
*Assistant Examiner* — Peian Lou
(74) *Attorney, Agent, or Firm* — Fish & Richardson P.C.

(57) ABSTRACT

A system and method for addressing RLC unrecoverable errors experienced by User Equipment (UE) in a wireless network help the network to resolve the errors without shifting the UE into an Idle mode and dropping voice calls. A measurement event provides the buffer occupancy and identifies the affected radio bearer to the network. If the state of the bearer is not changed, the UE provides a Signaling Connection Release Indication message or a Radio Bearer Release Indication message to the network, the latter message identifying the radio bearer to be released without taking down the entire signaling connection for the domain.

14 Claims, 8 Drawing Sheets

(51) Int. Cl.
*H04W 72/02* (2009.01)
*H04W 24/04* (2009.01)

(56) References Cited

U.S. PATENT DOCUMENTS

| | | | |
|---|---|---|---|
| 2005/0054298 | A1 | 3/2005 | Chen |
| 2005/0157649 | A1* | 7/2005 | Shin ............................. 370/235 |
| 2008/0064390 | A1* | 3/2008 | Kim ............................. 455/425 |
| 2011/0286387 | A1* | 11/2011 | Sane et al. .................... 370/328 |
| 2012/0207011 | A1* | 8/2012 | Franklin et al. ............... 370/216 |
| 2012/0281561 | A1* | 11/2012 | Shukla et al. ................. 370/252 |

OTHER PUBLICATIONS

Renesas Mobile Europe Ltd; "Introduction of Cell Update—Less RLC/PDCP Unrecoverable Error Recovery," 3GPP Draft; 25331_CRXXX (REL-10_R2-113180, 3rd Generation Partnership Project, Mobile Competence Centre; Route Des Lucioles; F-06921 Sophia-Antipolis Cedex; France, vol. RAN WG2, no. Barcelona, Spain; May 1, 2011, 2 pgs.

PCT Notification Concerning Transmittal of International Preliminary Report on Patentability and Written Opinion of the International Searching Authority issued in corresponding International Application No. PCT/EP2012/060757, dated Dec. 27, 2013.

Renesas Mobile Europe LTD: "Cell update-less RLC/PDCP unrecoverable error recovery", 3GPP Draft; R2-113178 Cell Update—Less Unrecoverable Error Recovery, 3rd Generation Partnership Project (3GPP), Mobile Competence Centre; 650, Route Des Lucioles; F-06921 Sophia-Antipolis Cedes; France, vol. RAN WG2, no. Barcelona, Spain; 20110509, May 1, 2011, XP050495010.

Telecom Modus: "Clarification to Cell Update Procedure", 3GPP Draft; R2-99109, 3rd Generation Partnership Project (3GPP), Mobile Competence Centre; 650, Route Des Lucioles; F-06921 Sophia-Antipolis Cedes; France, vol. RAN WG2, no. Stockholm; Mar. 19, 1999, XP050112374.

3GPP TS 25.321 V10.2.0 (Mar. 2011) section 8.2.2, "3rd Generation Partnership Project; Technical Specification Group Radio Access Network; Medium Access Control (MAC) protocol specification (Release 10)," 198 pages.

3GPP TS 25.331, ETSI TS 125 331 V7.6.0 (Oct. 2007) sections 8.4.2 and 8.3.1.2 "Universal Mobile Telecommunications System (UMTS); Radio Resource Control (RRC); Protocol specification," 1460 pages.

3GPP TS 25.413 V3.11.1, ETSI TS 125 413 V3.11.1 (Sep. 2002) "Universal Mobile Telecommunications System (UMTS); UTRAN lu interface RANAP signalling," 199 pages.

3GPP TS 25.413 V5.7.0, ETSI TS 125 413 v5.7.0 (Dec. 2003) "Universal Mobile Telecommunications System (UMTS); UTRAN lu interface Radio Access Network Application Part (RANAP) signalling," 254 pages.

3GPP TS 25.433 V3.11.0 (Sep. 2002) 3rd Generation Partnership Project; Technical Specification Group Radio Access Network; UTRAN lub interface NBAP signalling (Release 1999), 448 pages.

3GPP TS 25.433 V5.7.0, ETSI TS 125 433 V5.7.0 (Dec. 2003) "Universal Mobile Telecommunications Systems (UMTS); UTRAN lub interface NBAP signalling," 678 pages.

* cited by examiner

METHOD AND APPARATUS FOR RADIO RESOURCE CONTROL PROCEDURES

RELATED APPLICATIONS

This application claims the benefit of priority under 35 U.S.C. §119(e) of U.S. Provisional Application No. 61/493, 826, filed Jun. 6, 2011, the disclosure of which is incorporated herein by reference.

FIELD OF THE DISCLOSURE

The present invention relates to radio resource control (RRC) procedures between User Equipment (UE) or other wireless or mobile device and a wireless network.

BACKGROUND

A Universal Mobile Telecommunication System (UMTS) is a broadband, packet based system for the transmission of text, digitized voice, video and multi-media. It is a highly subscribed to standard for third generation and is generally based on Wideband Coded Division Multiple Access (W-CDMA).

In a UMTS system, the Radio Access Network (UTRAN) is responsible for radio communications with mobile User Equipment (UEs). The UTRAN comprises a plurality of Radio Network Subsystems (RNS), each having a Radio Network Controller (RNC). Each RNC is associated with one or more Node Bs, which operate similarly to a base station transmitter in GSM radio networks. The Node Bs send and receive wireless signals to the plurality of UEs within one or more a cell regions. A number of Node B cells grouped together form a UTRAN Registration Area (URA).

The UTRAN is also responsible for communications with a core network (CN). The core network operates in both the circuit-switched (CS) and the packet-switched (PS) domains. Circuit switched traffic is routed to a Mobile Switching Centre (MSC) in the core network, which is a computer that places the calls, and takes and receives data from the subscriber or from Public Switched Telephone Network (PSTN). Packet data is routed through a Service GPRS Support Node (SGSN) in the core network, which is responsible for the delivery of data packets from and to the UEs within its geographical service area.

For establishing and prioritizing Quality of Service (QoS) for communication between a UE and the CN, radio access bearers (RABs) are set up as specified by the CN. For UMTS, quality classes for RABs come in four types: conversational, streaming, interactive, or background. Each type has a different level of assurance against data loss or corruption.

Despite the QoS of the RABs, in the transfer of data between a RNC and a UE across a radio bearer, errors in the transmission or reception of the data may arise. For example, packet data may be corrupted or delayed due to various disturbances in the switching network or due to system congestion. This loss of data is most readily detected by the UE and UTRAN involving functions of the Radio Link Control (RLC) layer.

The RLC layer is part of Layer 2 in the protocol stack for a UMTS network. The RLC layer provides a number of functions for both user and control data passing between a RNC and a UE, including segmentation and retransmission services. These services can be provided by the RLC layer on variable-length protocol data units (PDUs) received from the Medium Access Protocol (MAC) layer. The service of the RLC layer in the control plane is called a Signaling Radio Bearer (SRB), and the service in the user plane is called a Radio Bearer (RB).

Generally, the term "radio bearer" refers to radio resources assigned between the UE and the UTRAN. And, the term "radio access bearer" generally refers to radio resources assigned between the UE and, e.g., a SGSN (Serving GPRS Service Node). The present disclosure shall, at times, refer to the term radio resource, and such term shall refer, as appropriate, to either or both the radio bearer and/or the radio access bearer.

The RRC configures each instance of the RLC layer to operate in one of three modes: transparent, unacknowledged, or acknowledged mode. In transparent mode, erroneous PDUs can be discarded, and transmission can be streaming without segmentation. In unacknowledged mode, erroneous data that is received is either marked or discarded, but no retransmission performed. In acknowledged mode, the RLC layer provides an assured mode of delivery for PDUs. An automatic repeat request (ARQ) system is followed to check for errors in delivery and to provide retransmissions. Data in the form of PDUs delivered in the acknowledged mode for the RLC are referred to as "RLC AMD PDUs."

The 3GPP standards currently address the situation of a UE not receiving appropriate acknowledgement from the network after sending RLC AMD PDUs on the uplink. In general, after identifying a problem in not receiving acknowledgement and exhausting its defined attempts at retransmission, the transmitting RLC of the UE sends a RESET command to the receiving RLC. If proper acknowledgement of the RESET does not occur after a certain period of time, the transmitting RLC in the UE identifies a "RLC unrecoverable error."

DESCRIPTION OF EXEMPLARY EMBODIMENTS

Reference will now be made in detail to exemplary embodiments, examples of which are illustrated in the accompanying drawings. Wherever possible, the same reference numbers will be used throughout the drawings to refer to the same or like parts.

The examples and embodiments provided below describe various methods and systems for maintaining a circuit-switched call for User Equipment (UE) or other mobile device during a RLC unrecoverable error in a wireless network such as, for example, a UMTS network. It is to be understood that other implementations in other types of networks are also possible. For example, the same teachings could also be applied to a Code-Division-Multiple-Access (CDMA) network (e.g. 3GPP2 IS-200), Wideband-CDMA (W-CDMA) network (e.g. 3GPP UMTS/High-Speed Packet Access (HSPA)) network, an Evolved UTRAN network (e.g. LTE), or by way of generalization, to any network based on radio access technologies that utilize network-controlled radio resources or that does not maintain any knowledge of the status of device application level data exchanges.

The specific examples and implementations described below although presented for simplicity in relation to UMTS networks are also applicable to these other network environments. Further, the network element is sometimes described below as the UTRAN. However, if other network types besides UMTS are utilized, the network element can be selected appropriately based on the network type. Further, the network element can be the core network in a UMTS system or any other appropriate network system, where the network element is the entity that makes transition decisions.

A Radio Resource Control (RRC) part within Layer 3 of the well-known protocol stack for a UMTS network is responsible for the assignment, configuration and release of radio resources between the UE and the UTRAN. This RRC protocol is described in detail in the 3GPP TS 25.331 specifications. Two basic modes that the UE can be in are defined as "idle mode" and "UTRA RRC connected mode" (or simply "connected mode", as used herein). UTRA stands for UMTS Terrestrial Radio Access.

In idle mode, the UE or other mobile device is required to request a RRC connection whenever it wants to send any user data or in response to a page whenever the UTRAN or the Serving General Packet Radio Service (GPRS) Support Node (SGSN) pages it to receive data from an external data network such as a push server. Idle and Connected mode behaviors are described in detail in the Third Generation Partnership Project (3GPP) specifications TS 25.304 and TS 25.331, each of which are hereby incorporated by reference in their entirety.

Figure 1:
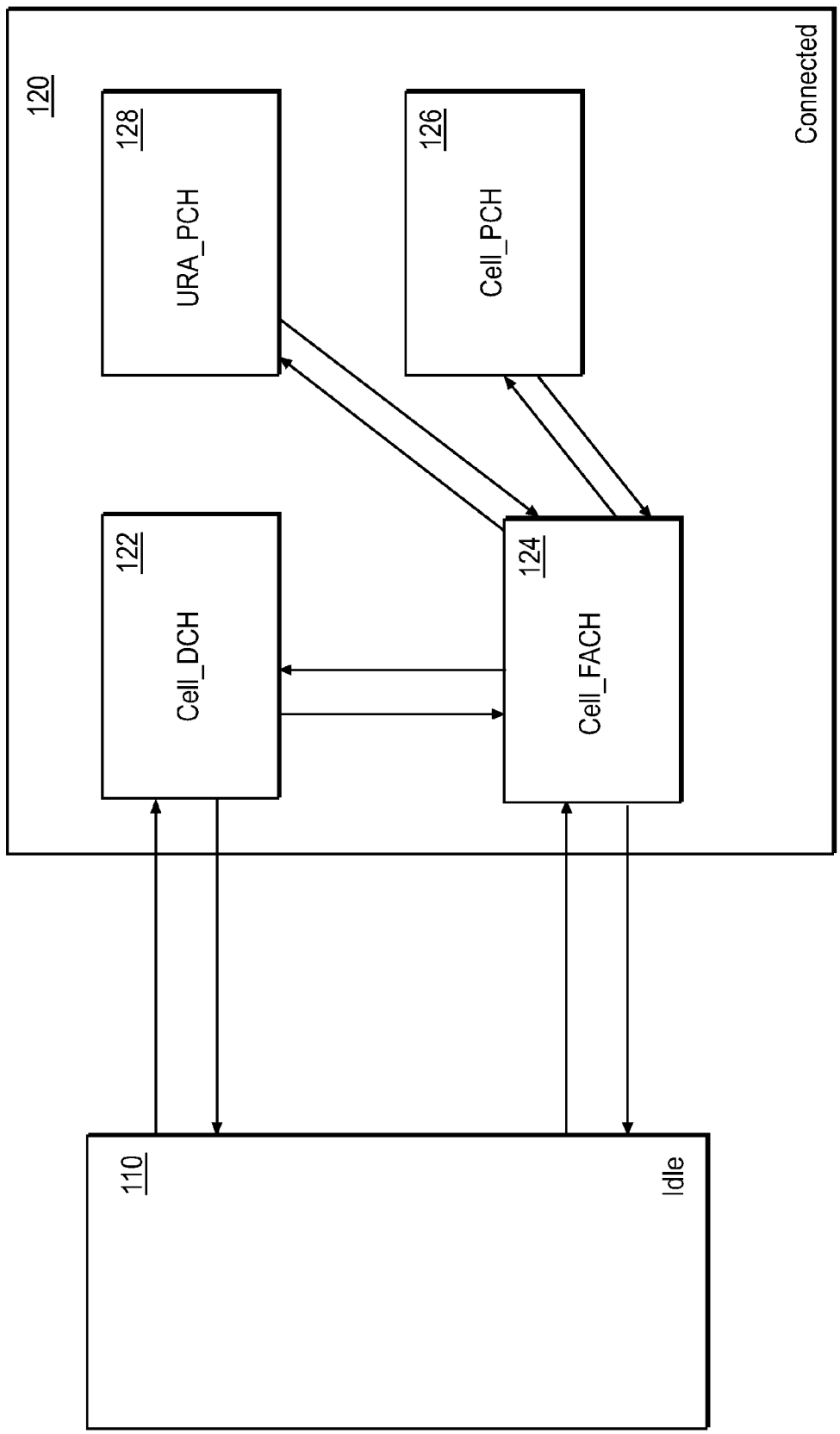
FIG. 1 is a block diagram showing RRC states and transitions.
Figure 2:
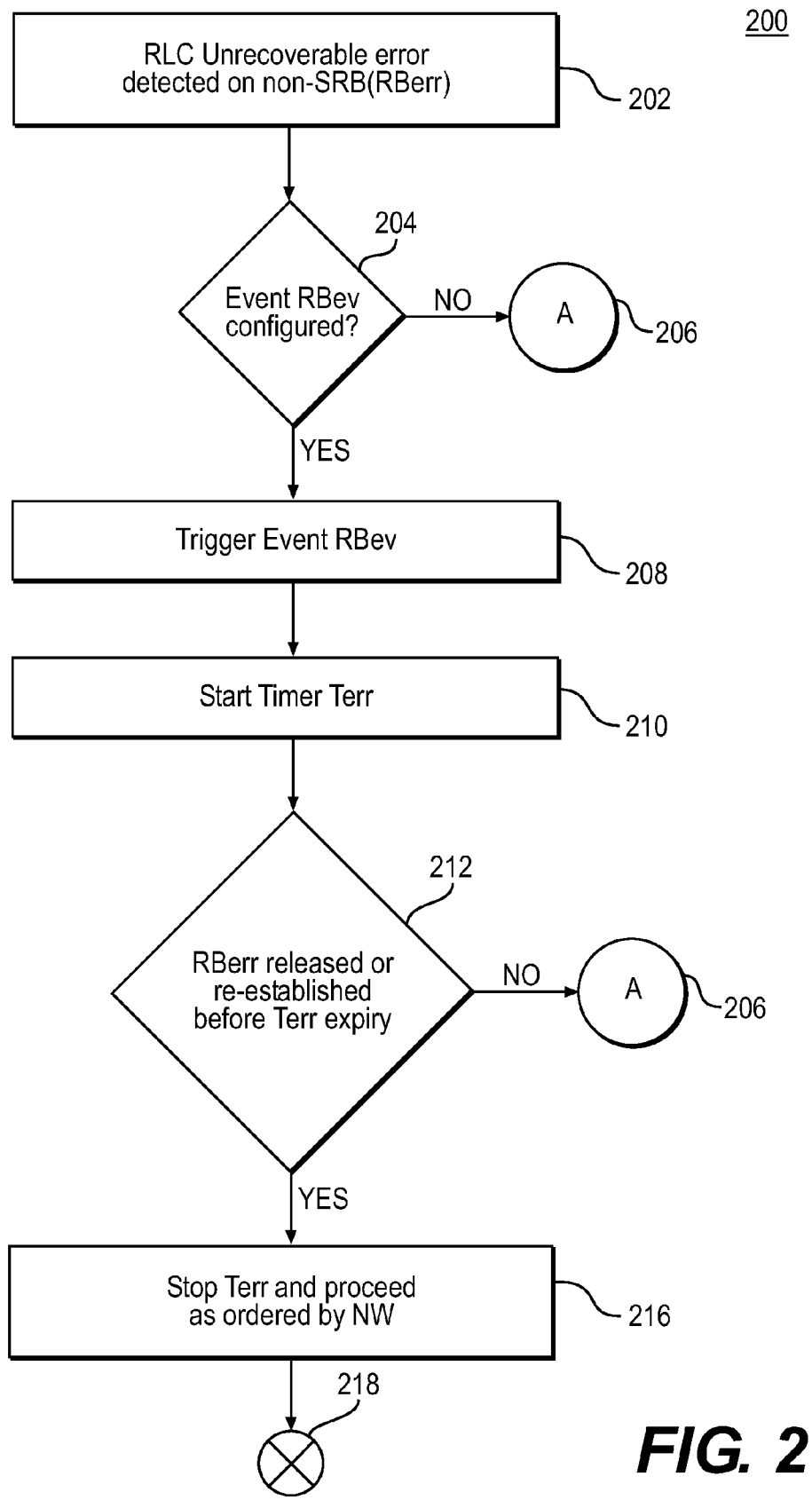
FIG. 2 is a first portion of a flow chart depicting the steps performed by User Equipment in response to a RLC unrecoverable error.

When in a UTRA RRC connected mode, the device can be in one of four states, which are illustrated in the block diagram of FIG. 1. These are:

CELL_DCH (122): A dedicated channel and/or shared channel is allocated to the UE in uplink and downlink in this state to exchange data. The UE must perform actions as outlined in 3GPP 25.331.

CELL_FACH (124): no dedicated channel is allocated to the user equipment in this state. Instead, common channels are used to exchange a small amount of bursty data. The UE must perform actions as outlined in 3GPP 25.331 which includes the cell selection process as defined in 3GPP TS 25.304.

CELL_PCH (126): the UE uses Discontinuous Reception (DRX) to monitor broadcast messages and pages via a Paging Indicator Channel (PICH). No uplink activity is possible. The UE must perform actions as outlined in 3GPP 25.331 which includes the cell selection process as defined in 3GPP TS 25.304. The UE must perform the CELL UPDATE procedure after cell reselection.

URA_PCH (128): the UE uses Discontinuous Reception (DRX) to monitor broadcast messages and pages via a Paging Indicator Channel (PICH). No uplink activity is possible. The UE must perform actions as outlined in 3GPP 25.331 including the cell selection process as defined in 3GPP TS 25.304. This state is similar to CELL_PCH 126, except that URA UPDATE procedure is only triggered via UTRAN Registration Area (URA) reselection.

The transition from an idle mode 110 to the connected mode 120 and vice-versa is controlled by the UTRAN. When an idle mode UE requests a RRC connection, the network decides whether to move the UE to the CELL_DCH 122 or CELL_FACH 124 state. When the UE is in a RRC connected mode 120, again it is the network that decides when to release the RRC connection. A voice call in UMTS occurs over a circuit-switched (CS) network and must have the UE in a CELL_DCH state 122. Moving out of CELL_DCH can lead to interruption or dropping of the call.

The details for how a UE should respond to a RLC unrecoverable error are addressed in part in 3GPP TS 25.331 section 8.3.1.2. In short, the UE will perform a Cell Update procedure using the cause "RLC unrecoverable error." As part of this Cell Update, the UE will enter the CELL_FACH state 124. Moreover, the UE can indicate to the RNC whether the error has occurred on a signaling radio bearer by indicating within an Information Element (IE) "AM_RLC error indication (RB2, RB3 or RB4)." Alternatively, the UE can indicate that the error has arisen on a radio bearer with an identification higher than 4 by indicating on an IE that "AM_RLC error indication (RB>4)."

After reporting the RLC unrecoverable error, the UE may wait to monitor the state of various timers. The most notable timers in the standard for this function are called T314 and T315. During this period, the RNC can respond with a "Cell Update Confirm" message and reestablish the flawed RBs or SRBs identified in the IE received from the UE. This action may correct the problem, hopefully without disruption to the user of the UE. On the other hand, if the timers expire without correction of the fault, the UE will eventually move to Idle mode 110, releasing its existing RABs and dropping its connection with the network.

Several drawbacks exist with the current arrangement for handling a RLC unrecoverable error by a UE under 3GPP, particularly in scenarios with RABs in both the circuit-switched and the packet-switched domains (called "multi-RAB" or "CS+PS RAB"). In a multi-RAB scenario, a user may be engaging in a voice call and accessing data simultaneously. The UE will operate in the CELL_DCH mode 122 for the voice call. Moving the UE to CELL_FACH mode 124 during the Cell Update due to an RLC unrecoverable error, even if no problem exists with the voice call, can disrupt the voice service. Ideally, the network will reestablish the voice and data connections after conducting the Cell Update, including moving the UE back to CELL_DCH 122, but the interruption to the call could be several seconds. This passage of time may be a disruption to the user. Moreover, in acting on the Cell Update, the RNC for many reasons could decide not to reestablish the voice call, which would lead to a dropped call entirely.

In addition, the network operator has the discretion of configuring and operating the various timers for the UE to monitor after reporting a Cell Update due to a RLC unrecoverable error. Therefore, a UTRAN may have one or more of the relevant timers not configured and fixed at zero. In that event, after commencing Cell Update due to RLC unrecoverable error, the UE will immediately release all its radio resources and enter Idle mode. Consequently, the user's voice call will be dropped, even though the error causing the dropped call may have had nothing to do with the voice connection.

The risk of failure in the PS domain leading to RLC unrecoverable errors becomes more evident as Ethernet is used more prominently in the UTRAN. In particular, ATM has historically been used for handling packet data at the Iub interface between the RNC and Node B. As Ethernet is implemented more often at this interface, its higher likelihood of data errors may translate to more RLC unrecoverable errors in the PS domain. Ethernet usage may also increase with the pico cell coverage implemented by network providers.

Accordingly, occurrences of isolated dropping of voice calls may rise due to unrelated data issues under the current standards scheme.

In a particular example, the present system and method provide for maintaining a voice call during a RLC unrecoverable error while directing more particular information to the network or RNC about flaws on a PS RAB that should be reestablished or released. In particular, the present method and apparatus provide for maintaining the voice call in case of an unrecoverable error on any of the AM RLC entities on the radio bearers RB5 or upward. The method and apparatus separate the handling of the CS connection and the PS radio bearers, so that RLC unrecoverable errors that may arise on those PS radio bearers may be corrected without disturbing the CS connection. These principles may be extended to preserving certain PS connections while selectively releasing one or more others having RLC unrecoverable errors.

In one implementation consistent with aspects of the present disclosure, the UE first determines whether there is more than one PS RAB. If a RLC unrecoverable error occurs on any one of the PS RABs, then the UE performs a Cell Update while remaining in the CELL_DCH state. Under current 3GPP standards, Cell Update is only valid using the Common Control Channel (CCCH), which requires the UE to transition to the CELL_FACH state. According to the present approach, Cell Update is performed using the Dedicated Control Channel (DCCH) associated with operation in the CELL_DCH mode. In this arrangement, the UE can avoid having to drop an existing CS call functioning in the CELL_DCH mode due to an unrelated RLC unrecoverable error on a PS radio bearer. The Cell Update procedure in this implementation could otherwise proceed according to conventional methods.

Other steps may be performed prior to and during performance of a Cell Update procedure while in CELL_DCH mode. For example, in the conventional processes, a UE experiencing a RLC unrecoverable error moves into CELL_FACH to perform a cell reselection procedure to find the best available cell. After camping on that cell with the best RF conditions, the UE then performs Cell Update procedure. Following the process of this disclosure, a UE identifying an RLC unrecoverable error while in CELL_DCH may determine that its RF conditions are of sufficient quality to remain in that RRC state with the existing cell. In that event, the UE can avoid moving to CELL_FACH and can commence with the Cell Update while in CELL_DCH over DCCH. This procedure has applicability not only to avoiding a dropped voice call during a multi-RAB scenario, but also in ensuring that interruption and possible data loss do not happen if the scenario is entirely in the PS domain.

Another implementation consistent with the present disclosure for addressing RLC unrecoverable errors without interrupting a CS call involves sending a modified SIGNALING CONNECTION RELEASE INDICATION (SCRI) message to the RNC while in CELL_DCH state without sending a Cell Update message. A basic SCRI message is described in TS 25.331 and is used to indicate the release of all radio resources for a domain. The modified SCRI message for the present implementation may indicate the radio bearer having the error (RBId) and the domain (PS). It may also include the Information Element "Signaling Connection Release Indication Cause" with a cause not contemplated by the current standards, namely "RLC unrecoverable error" or "RLC unrecoverable error on RB5 and up."

Acting on this modified SCRI message, the network will take down all RABs associated with the PS domain for the UE. Accordingly, the UE will be able to effectively remove the AM RLC having difficulties without affecting the active voice call. This solution requires little modification to the messaging scheme of UMTS and, compared with the risk of the network dropping the voice call altogether by moving the UE to an Idle mode, sacrifices the PS RABs to ensure continuation of the CS connection.

To assist the RNC in resolving RLC unrecoverable errors, the present system and method contemplate providing additional information to the network about the error. In particular, a measurement report from the UE may be generated relating to a RLC unrecoverable error on a radio bearer. As is known in the art and from existing 3GPP standards, measurement reporting is an integral part of UMTS and part of the ability of the UTRAN to monitor activity with the UE. Measurement reports may include physical layer features regarding power levels and frequencies, as well as information relating to traffic volume measurements and other data. Under current standards, such as TS 25.331 section 8.4.2, a MEASUREMENT REPORT message is sent from the UE in the CELL_DCH mode, for example. The MEASUREMENT REPORT is sent when the reporting criteria stored in a variable called MEASUREMENT_IDENTITY are met for any ongoing measurements that are being performed in the UE.

For simplicity, the measurement event of the present system and method is called "RBev" for Radio Bearer Event. RBev in essence indicates that a problem has arisen on one of the PS RABs. For this implementation, the variable MEASUREMENT_IDENTITY would be met when the UE detects a RLC unrecoverable error under the known processes for such detection.

Within event RBev may be several measurement or status criteria to assist the RNC with resolving the RLC unrecoverable error. First, in one implementation, RBev may indicate with a parameter called "RBId" the identification of the PS radio bearer in which the problem exists, i.e., the PS radio bearer for which the RLC unrecoverable error has arisen. Since RB 0-4 are used for signaling radio bearers, RBId will identify one or more of RB 5 and above.

Second, measurement event RBev may include the Buffer Occupancy (BO) for the UE. As known to those skilled in the art, and as described in TS 25.321 section 8.2.2, BO indicates for each logical channel the amount of data in a number of bytes that is available for transmission and retransmission in the RLC layer. Also, when the MAC is connected to an AM RLC entity, the BO will also include control PDUs to be transmitted, RLC PDUs outside the RLC Tx window, and RLC PDUs that have been transmitted but not negatively acknowledged by the peer entity.

Third, measurement event RBev may include a timer value, such as one termed "Terr." As explained in more detail below, Terr in essence designates a period of time during which the UE will wait for the network to resolve the RLC unrecoverable error on the PS RB before taking other action.

Although three are described here, other measurements or status criteria may be performed or collected as part of measurement event RBev without departing from the principles of RBev.

In addition to measurement event RBev, an implementation of the present system and method may include a dedicated message from the UE to the RNC referred to as a RADIO BEARER RELEASE INDICATION (RBRI) message. The RBRI message in essence identifies a particular radio bearer whose resources should be released. This RBRI message reports to the RNC the identification of the PS radio bearer experiencing the RLC unrecoverable error, i.e., the RBId from measurement event RBev. The RBRI message is appended with a radio bearer release indication cause field. The radio bearer release indication cause field includes at least that the radio bearer release indication is based on an abnormal condition or state associated with the RBId, namely, a RLC unrecoverable error. Other information may be included within or affiliated with a RBRI message without departing from the principles of the RBRI message as disclosed herein.

On receipt of the RBRI message, the RNC learns the identity of the particular PS RB having a RLC unrecoverable error (also known as "RBerr") and learns that the UE has released that radio bearer. Consequently, the RNC can also release RBerr. As such, the RNC acting on RBRI should not take down all signaling connections or RABs associated with that UE due to the RLC unrecoverable error, which might otherwise be the case when acting on a conventional Cell Update message from the UE with a cause of RLC unrecoverable error.

Several embodiments of the principles for the present system and method can assist with selectively releasing defective PS radio bearers without disrupting a simultaneous CS connection. For example, in one possibility, a UTRAN is arranged to configure the measurement event RBev for UEs operating within it. When a UE operating in CELL_DCH in a multi-RAB scenario then detects a RLC unrecoverable error, the UE triggers a MEASUREMENT REPORT message including the results of measurement event RBev. The UE should trigger this report message rather than issue a Cell Update and move to CELL_FACH, as would be done conventionally. As a result, the MEASUREMENT REPORT sends information relating to the existence of the RLC unrecoverable error, the bearer on which the error has occurred (RBerr), the data pending on the UE still to be sent to the defective AM RLC on the uplink, and the length of time the UE will wait for the network to correct the error. Armed with this knowledge, the network can then decide how best to address the error on the PS RBerr.

If the period of timeidentified in the MEASUREMENT REPORT expires (i.e., Terr=O), then the UE can take steps of its own to correct the problem. In particular, the UE can release the radio resources for RBerr only and send a RBRI message to the RNC. Again, the RBRI message identifies RBerr for the network and that the cause of the problem is RLC unrecoverable error. Acting on the RBRI message, the RNC can then also release only the radio resources associated with RBerr.

Following this process of sending a MEASUREMENT REPORT based on a measurement event RBev, waiting for the network to resolve the RLC unrecoverable error and, if not, dropping the resources for RBerr and sending a RBRI message to the network, the UE can more gracefully address the AM RLC problem than in the conventional systems. In doing so, the UE operating in a multiRAB environment can hopefully have the network correct the precise RB having the problem and, if not, remove that RB without disrupting a voice call transpiring simultaneously on a CS RAB.

If the period of time identified in the MEASUREMENT REPORT expires (i.e., Terr=0), then the UE can take steps of its own to correct the problem. In particular, the UE can release the radio resources for RBerr only and send an RBRI message to the RNC. Again, the RBRI message identifies RBerr for the network and that the cause of the problem is RLC unrecoverable error. Acting on the RBRI message, the RNC can then also release only the radio resources associated with RBerr.

Following this process of sending a MEASUREMENT REPORT based on a measurement event RBev, waiting for the network to resolve the RLC unrecoverable error and, if not, dropping the resources for RBerr and sending an RBRI message to the network, the UE can more gracefully address the AM RLC problem than in the conventional systems. In doing so, the UE operating in a multi-RAB environment can hopefully have the network correct the precise RB having the problem and, if not, remove that RB without disrupting a voice call transpiring simultaneously on a CS RAB.

Extensions and modifications of the described approach to maintaining a CS call are also contemplated by the present disclosure, particularly those that enable more efficient and precise correction of the RLC unrecoverable error without moving to CELL_FACH state or sending a Cell Update message. Some are described below.

For example, a modified SCRI message as described above may be submitted by the UE rather than the RBRI message. That is, following the measurement event RBev, the MEASUREMENT REPORT message, and expiration of the timer Terr, the UE may opt to send a modified SCRI message to the network to try to resolve the RLC unrecoverable error. Rather than identify a particular RB to be released as with the RBRI message, the modified SCRI message will release the whole signaling connection for the PS domain.

In other variations for addressing RLC unrecoverable errors, the UE may first determine that the radio bearer experiencing the AM RLC error (RBerr) is not the same domain as all active RABs. For example, RBerr is in the packet-switched domain, but other RABs are in the circuit-switched domain. If the UE then also concludes that RBerr is the only active RB, such as by determining that the only active RBId=RBerr, then the UE may send a modified SCRI message to the network on DCCH using AM RLC. A modified SCRI message may indicate the radio bearer having the error (RBId) and the domain (PS). It may also include the Information Element "Signaling Connection Release Indication Cause" with a cause not contemplated by the current standards, "RLC unrecoverable error" or "RLC unrecoverable error on RB5 and up."

In this instance, the modified SCRI message will essentially tell the network to take down all PS RABs for the UE. Since the UE has determined that RBerr is the only active radio bearer or that all active RBs are experiencing an RLC unrecoverable error, however, the tearing down of all signaling connections in the packet-switched domain for the UE is not excessive. Yet the use of the modified SCRI message rather than a conventional movement to CELL_FACH and Cell Update helps to avoid the risk of having the voice call dropped while the network attempts to correct the RLC unrecoverable error.

On the other hand, if RBerr is not the only active radio bearer for the UE, and other RBs are not experiencing RLC unrecoverable errors, the modified SCRI message and tearing down all packet-switched connections would affect PS RBs that are not flawed. In that situation, the UE could send an RBRI message rather than a SCRI message to the network. The RBRI message would identify the RBId for the flawed radio bearer RBerr, its domain, and the cause of the RLC unrecoverable error. Other information may be included as appropriate. Receiving the RBRI message, the RNC would not release all packet-switched radio resources for the UE. Instead, as discussed above, only the identified RBerr would be removed.

The choice of implementing a SCRI message, a RBRI message, or both as described above is within the discretion and knowledge of those of ordinary skill in the art. For instance, when multiple PS RABs exist, a RLC unrecoverable error may arise for all of them. In that scenario, a modified SCRI message would suffice to correct the problem by releasing all PS RABs and has the advantage of being a message currently within the 3GPP standards without the cause of RLC unrecoverable error. A RBRI message, on the other hand, provides a more targeted approach to release a PS RB. In scenarios where less than all PS RABs are flawed, the RBRI message will release only the identified PS RB, which may provide a more comprehensive approach for the network.

Notwithstanding the advantages of maintaining CS calls in a multi-RAB environment during a RLC unrecoverable error, the techniques of the present disclosure have applicability as well to radio connections in only one domain. In one implementation, the present system and method provide for directing more particular information to the network or RNC for correcting a RLC unrecoverable error. For example, if the radio bearer experiencing the AM RLC error (RBerr) and all other active RABs are in the packet domain, then particular steps may improve the correction of the error or the release of the radio resources.

In this scenario, although a CS call is not active, a RLC unrecoverable error may occur on one of a plurality of PS RABs. Applying the principles of this disclosure, the flawed PS RB may be selectively terminated so that the network can behave in a more informed manner and not release all PS RBs unnecessarily. Similar to preserving an existing CS call, an existing PS session may be preserved while the flawed PS RB is released. For example, consider a user engaging in a video call while browsing using a Wireless Access Protocol (WAP). If a RLC unrecoverable error arises on the RB for the WAP session, selectively releasing that WAP session using, for example, a RBRI message, should enable the video call to continue without being disconnected.

Under this implementation, the process may involve considering the state of timer T315. In particular, if the delay associated with waiting for the network to resolve the RLC unrecoverable error lapses (i.e., Terr=O) before RBerr is corrected and the network has configured the timer associated with resolving errors in the PS domain (i.e., T315>0), then two options exist. For option one, as discussed above, if all active radio bearers for the UE are experiencing a RLC unrecoverable error, the UE may send a modified SCRI message to the network on DCCH using AM RLC. The modified SCRI message may indicate the radio bearer having the error (RBId), the domain (PS), and a cause "RLC unrecoverable error" or "RLC unrecoverable error on RB5 and up." Other information may be included as well. The network will then release the radio resources for that domain.

Otherwise, if less than all active radio bearers for the UE are experiencing a RLC unrecoverable error, the UE would send a RBRI message rather than a modified SCRI message to the network. The RBRI message would identify the RBId for the flawed radio bearer RBerr, its domain, and the cause of RLC unrecoverable error. Other information may be included as well. Receiving the RBRI message, the RNC would not release all radio resources for the UE for that domain. Instead, as discussed above, only the identified RBerr would be removed. For option two, the UE may perform a Cell Update procedure.

The present system and method include yet another approach where the radio bearer experiencing the AM RLC error (RBerr) and all other active RABs are in the same domain. In particular, under this implementation, if the delay associated with waiting for the network to resolve the RLC unrecoverable error lapses (i.e., Terr=0) before RBerr is corrected and the timer associated with resolving errors in the PS domain is zero (i.e., T315=0), then two options exist. For option one, as discussed above, if all active radio bearers for the UE are experiencing an RLC unrecoverable error, the UE may send a SCRI message to the network on DCCH using AM RLC. The SCRI message may indicate the radio bearer having the error (RBId), the domain (PS), and a cause "RLC unrecoverable error" or "RLC unrecoverable error on RB5 and up." Other information may be included as well. The network will then release the radio resources for that domain.

Otherwise, if less than all active radio bearers for the UE are experiencing a RLC unrecoverable error, the UE would send a RBRI message rather than a SCRI message to the network. The RBRI message would identify the RBId for the flawed radio bearer RBerr, its domain, and the cause of RLC unrecoverable error. Receiving the RBRI message, the RNC would not release all radio resources for the UE for that domain. Instead, as discussed above, only the identified RBerr would be removed. For option two, the UE may move to an Idle mode.

It will be apparent from the disclosed subject matter that approaches discussed above may be implemented with or without measurement event RBev configured by the network. That is, processes and options for addressing a RLC unrecoverable error when RBerr is of the same domain as all active RABs or is not the same as all active RABs may be preceded by the triggering of a MEASUREMENT REPORT message to the RNC. In that situation, if the state of RBerr changes due to radio bearer release or reestablishment before the timer Terr expires, then Terr would be stopped and the UE would proceed as instructed by the network. However, if the network has not configured the relevant measurement event RBev, or if the network has not changed the state of RBerr before Terr expires, then the processes and options for addressing a RLC unrecoverable error as described above can proceed by the UE.

FIGS. 2-5 are portions of a single flow chart depicting method steps for addressing a RLC unrecoverable error consistent with the present disclosure and described in more detail above. In the first section of flow chart 20 in FIG. 2, the method begins at step 202 with the UE detecting a RLC unrecoverable error on a non-signaling radio bearer (RBerr). In step 204, the UE determines whether a measurement event RBev has been configured by the network. If not, the UE proceeds via step 206 to the process identified in flow chart 30 of FIG. 3, discussed below. If RBev has been configured, then the UE triggers the event RBev in 208. In 210, the UE also starts the timer Terr to wait for the network to resolve the RLC unrecoverable error. If the RBerr is released or reestablished by the network before Terr expires (212), then the UE stops timer Terr and proceeds as directed by the network (216), ending the process (218). If Terr expires before correction occurs, then the UE proceeds via step 206 to the process identified in flow chart 30 of FIG. 3.

Figure 3:
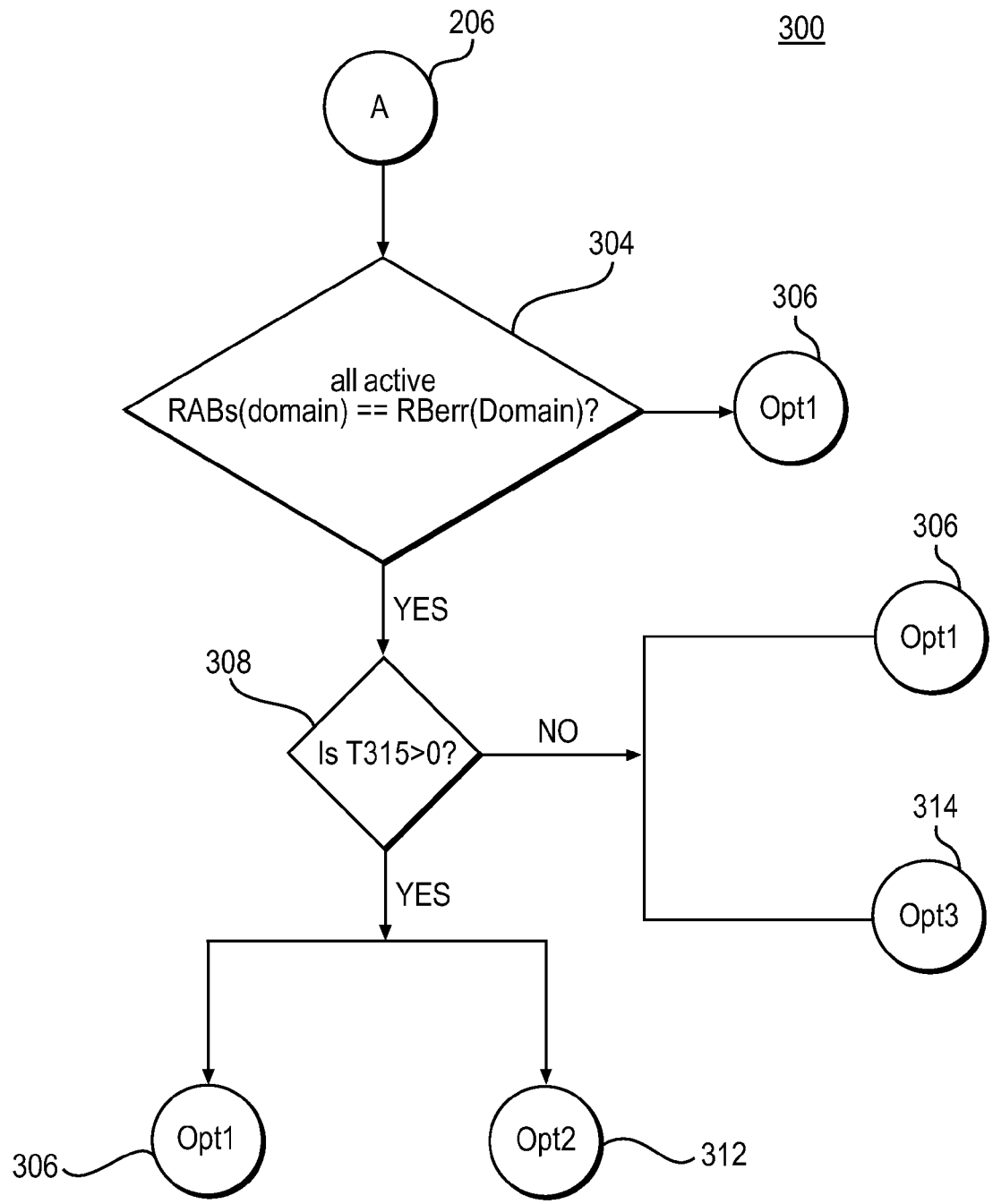
FIG. 3 is a second portion of the flow chart of FIG. 2.

The UE proceeds to the steps in FIG. 3 if the network has not configured the measurement event RBev or if timer Terr has expired without correction of the RLC unrecoverable error. In step 304, the UE determines whether all active RABs and the RB having the error (RBerr) are all the same domain. If not, the UE proceeds via step 306 to the process of Option 1 in flow chart 400 of FIG. 4, discussed below. If all active RABs and RBerr are the same domain, then the UE determines whether timer T315 is greater than 0 (308). If timer T315 is not greater than 0, then the UE may proceed to either Option 1 in flow chart 400 of FIG. 4 or Option 3 in flow chart 500 in FIG. 5 via 306 or 314. If timer T315 is greater than 0, then the UE may proceed to either Option 1 in flow chart 400 of FIG. 4 or Option 2 in flow chart 500 of FIG. 5 via 306 or 312.

Figure 4:
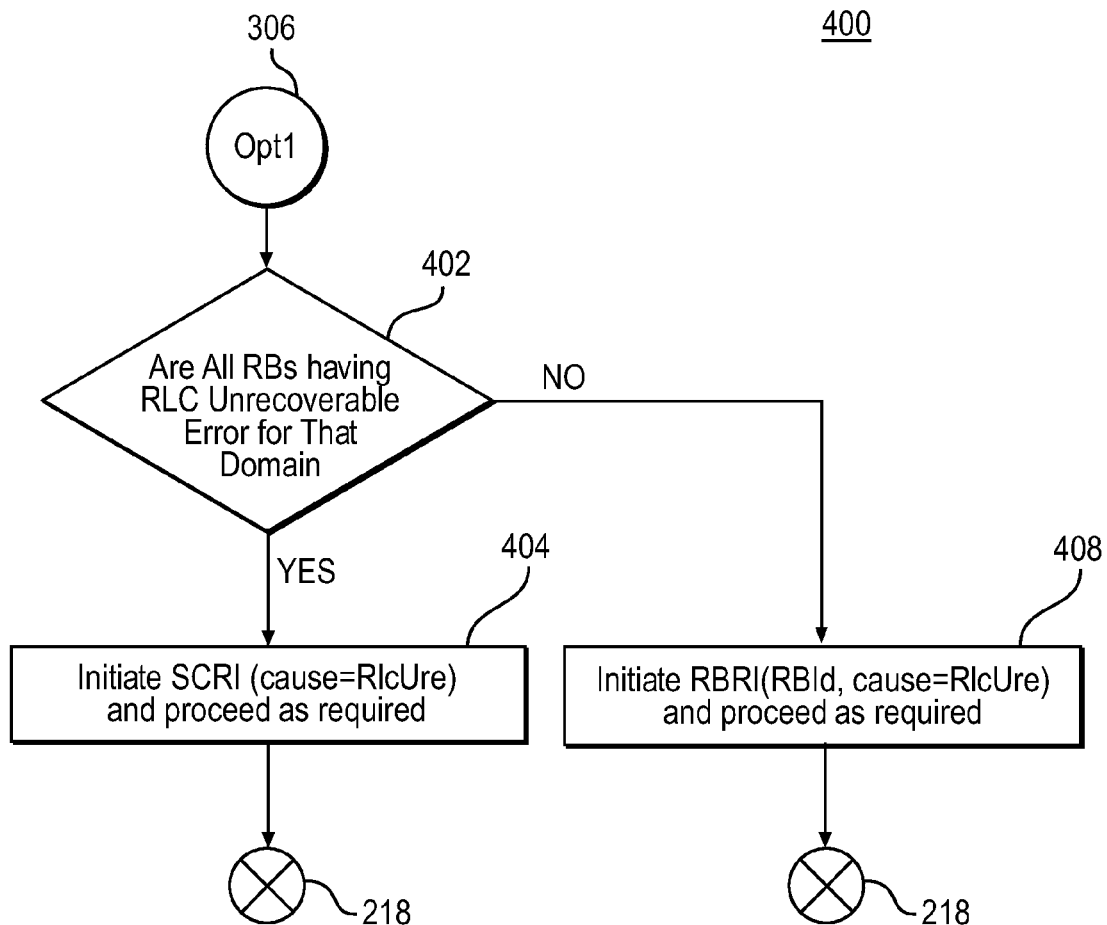
FIG. 4 is a third portion of the flow chart of FIGS. 2 and 3.

The flowchart 40 for Option 1 is illustrated in FIG. 4. Following Option 1 via step 306, the UE determines whether all radio bearers are experiencing RLC unrecoverable errors for that common domain in step 402. If so, the UE initiates a modified SCRI message with the cause being RLC unrecoverable error (RIcUre) in step 404. While the CN domain identity for a SCRI message may be designated for the packet-switched domain, the determination that all active RABs are of the same domain was already made in the process prior to step 306. The UE then proceeds as directed by the network and ends the process at step 218. If not all RBs are experiencing a RLC unrecoverable error for that domain, the UE initiates a RBRI message identifying the affected radio bearer with the value RBId and the cause being RLC unrecoverable error (RIcUre) in step 408. The UE then proceeds as directed by the network and ends the process at step 218.

Figure 5:
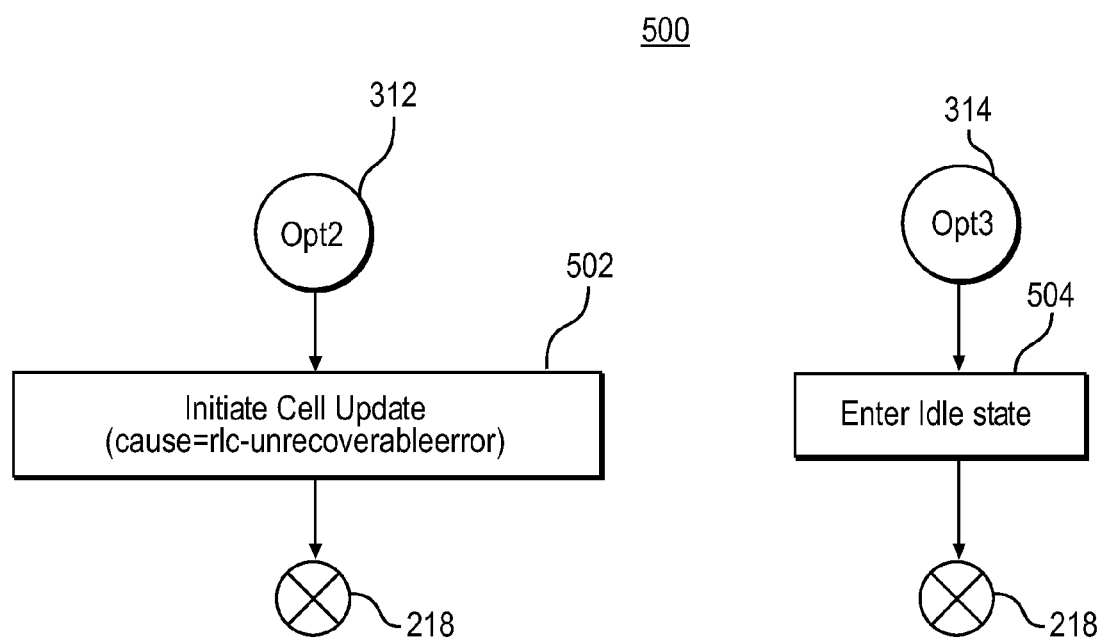
FIG. 5 is a fourth portion of the flow chart of FIGS. 2-4.

FIG. 5 illustrates the flowchart options 500. Following Option 2 (312) in FIG. 5, the UE may initiate a Cell Update with the cause RLC unrecoverable error in the conventional manner, as shown at 502, thereafter ending the process at step 218. Following Option 3 (314) in FIG. 5, the UE enters the Idle state at 504 and then ends the process at step 218.

Figure 6:
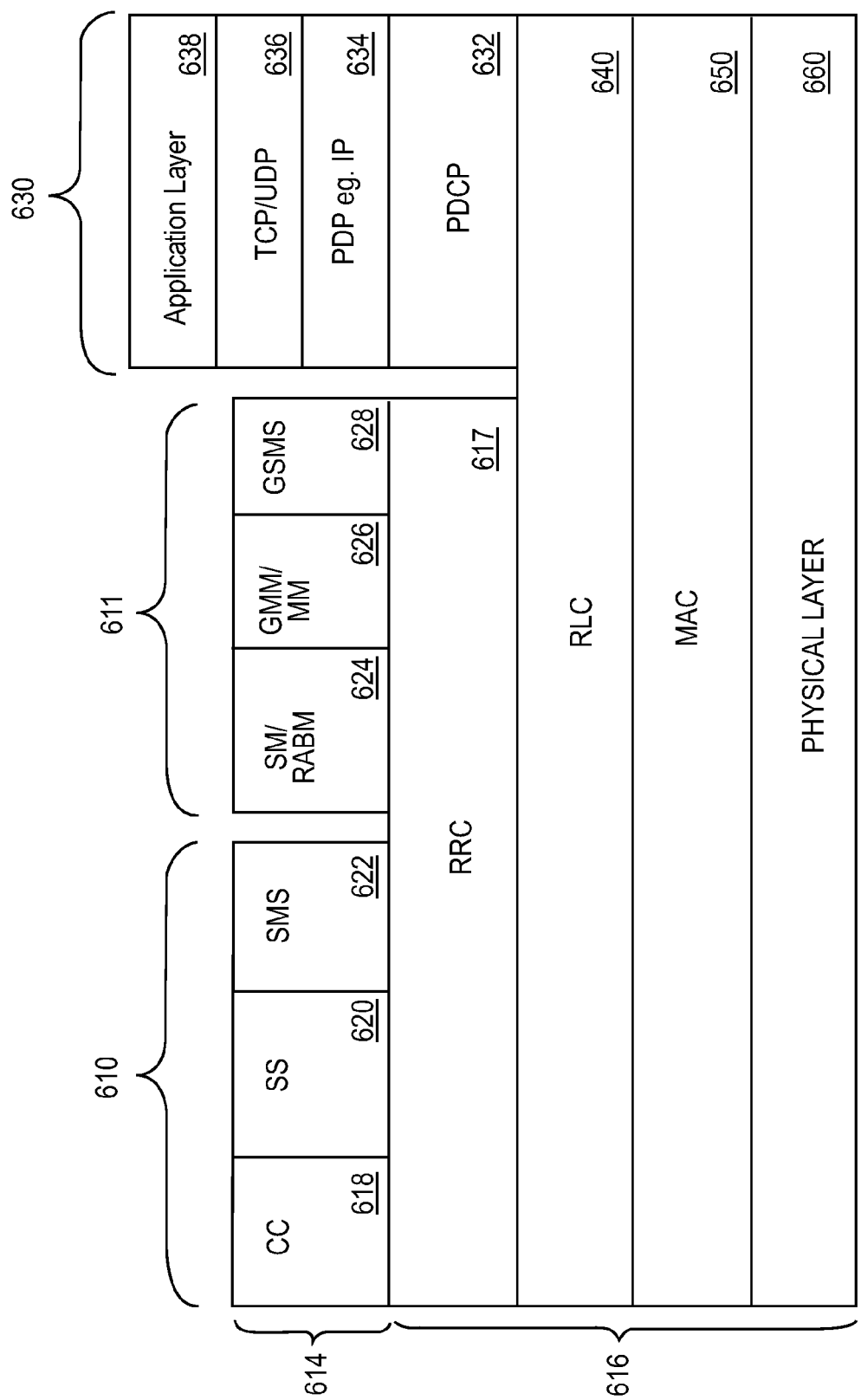
FIG. 6 is a block diagram of a UMTS protocol stack.

Reference is now made to FIG. 6. FIG. 6 illustrates a protocol stack for a UMTS network in which the system and method described above may operate. As seen in FIG. 6, the UMTS includes a CS control plane 610, PS control plane 611, and PS user plane 630. Within these three planes, a non-access stratum (NAS) portion 614 and an access stratum portion 616 exist.

NAS portion 614 in CS control plane 610 includes a call control (CC) 618, supplementary services (SS) 620, and short message service (SMS) 622. NAS portion 614 in PS control plane 611 includes both mobility management (MM) and GPRS mobility management (GMM) 626. It further includes session management/radio access bearer management SM/RABM 624 and GSMS 628.

CC 618 provides for call management signaling for circuit switched services. The session management portion of SM/RABM 624 provides for PDP context activation, deactivation and modification. SM/RABM 624 also provides for quality of service negotiation.

The main function of the RABM portion of the SM/RABM 624 is to connect a PDP context to a Radio Access Bearer. Thus SM/RABM 624 is responsible for the setup, modification and release of radio resources.

CS control plane 610 and PS control plane 611, in the access stratum 616 sit on radio resource control (RRC) 617. NAS portion 614 in PS user plane 630 includes an application layer 638, TCP/UDP layer 636, and PDP layer 634. PDP layer 634 can, for example, include Internet Protocol (IP).

Figure 8:
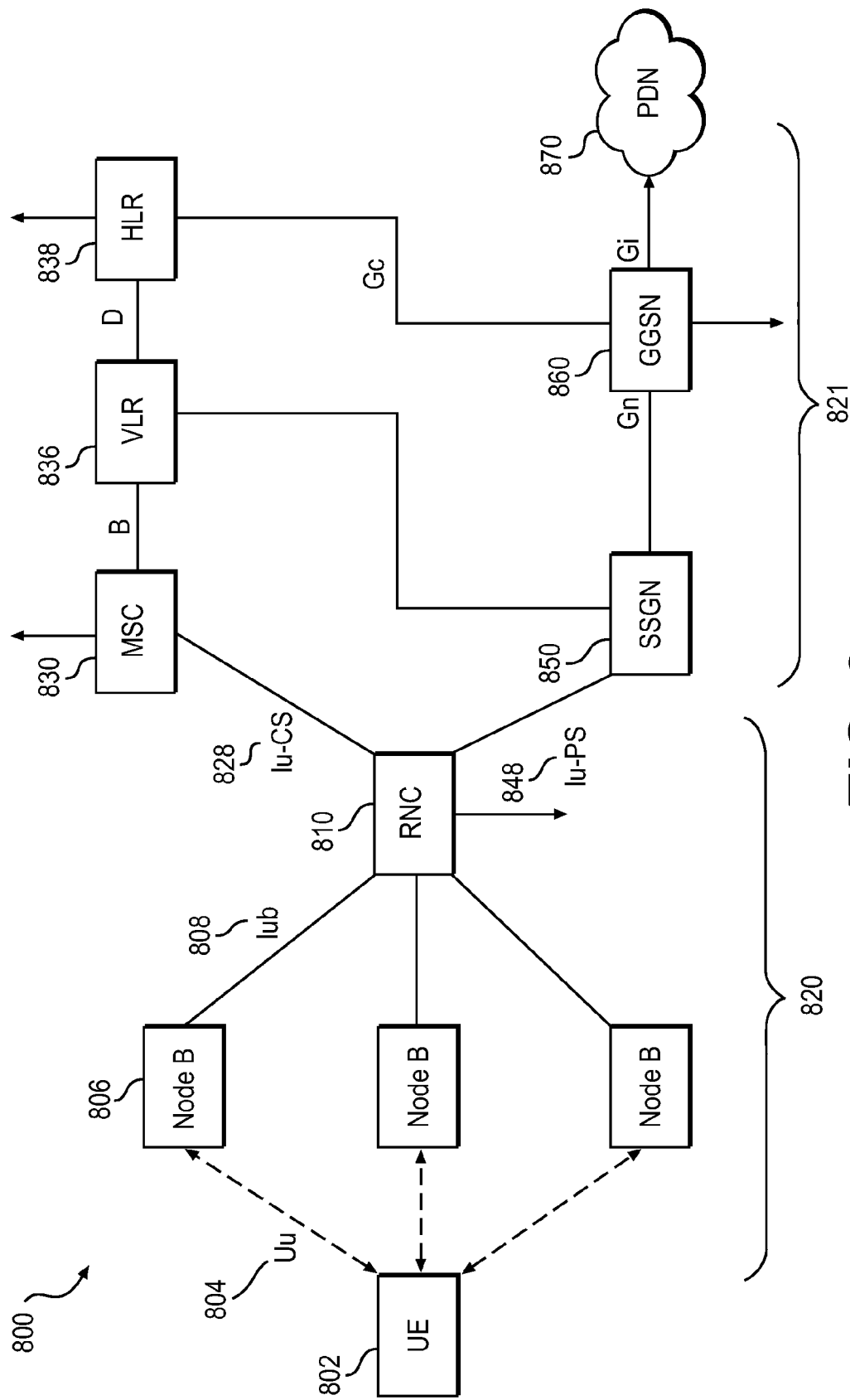
FIG. 8 is an exemplary network for use in association with the present method and system.

Access Stratum 616, in PS user plane 630 includes packet data convergence protocol (PDCP) 632. PDCP 632 is designed to make the WCDMA protocol suitable to carry TCP/IP protocol between UE and RNC (as seen in FIG. 8), and is optionally for IP traffic stream protocol header compression and decompression.

The UMTS Radio Link Control (RLC) 640 and Medium Access Control (MAC) layers 650 form the data link sub-layers of the UMTS radio interface and reside on the RNC node and the User Equipment.

The Layer 1 (L1) UMTS layer (physical layer 660) is below the RLC/MAC layers 640 and 650. This layer is the physical layer for communications.

Figure 7:
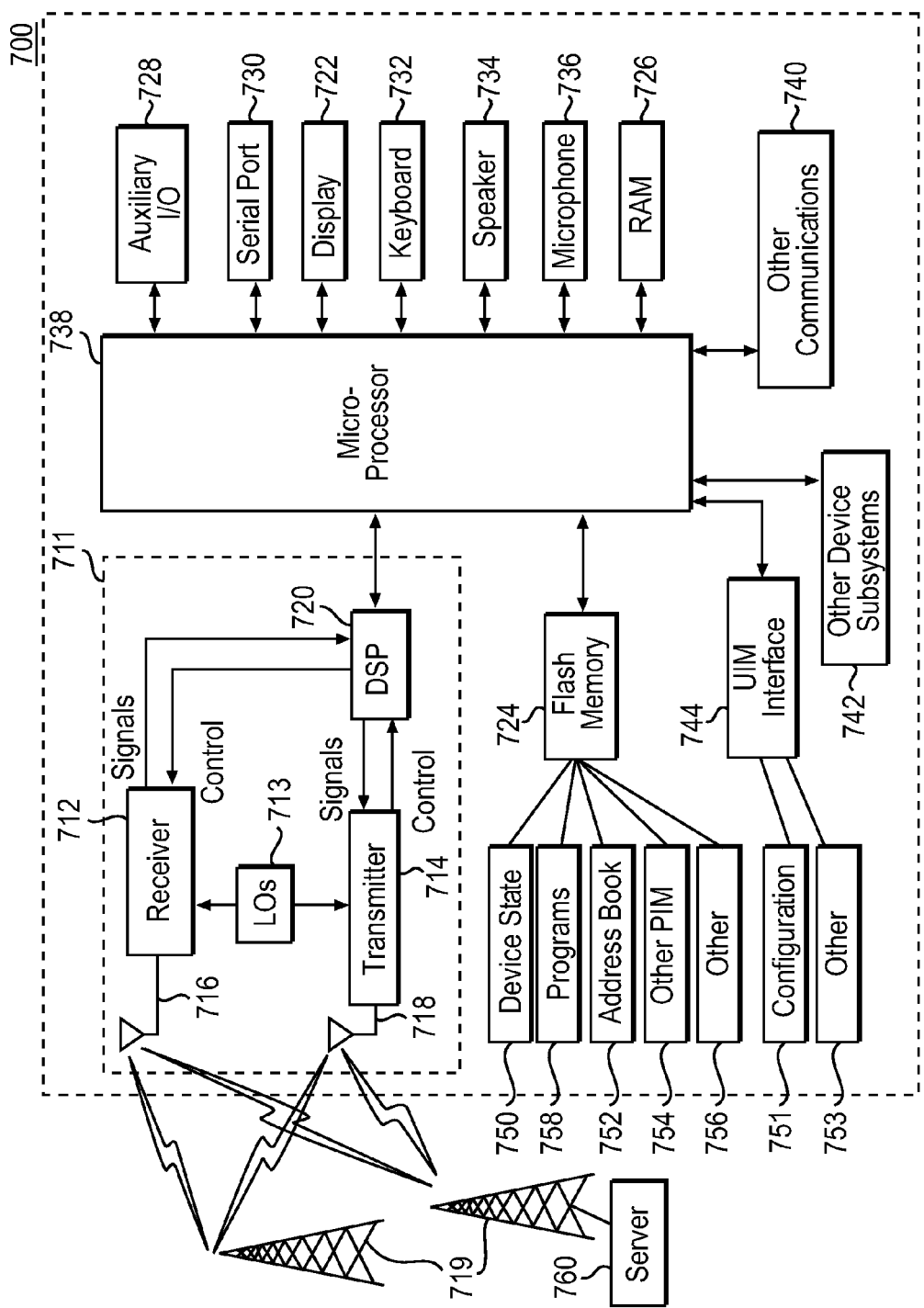
FIG. 7 is an exemplary UE that can be used in association with the present method.

While the above can be implemented on a variety of mobile or wireless devices, an example of one mobile device is outlined below with respect to FIG. 7. Reference is now made to FIG. 7.

UE 700 is preferably a two-way wireless communication device having at least voice and data communication capabilities. UE 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, UE 700 may include a communication subsystem 711 designed to operate within the GPRS network or UMTS network.

Network access requirements will also vary depending upon the type of network 719. For example, In UMTS and GPRS networks, network access is associated with a subscriber or user of UE 700. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 700 will be unable to carry out any other functions involving communications over the network 700. The UIM interface 744 is normally similar to a card-slot into which a card can be inserted and ejected like a diskette or PCMCIA card. The UIM card can have approximately 64K of memory and hold many key configuration 751, and other information 753 such as identification, and subscriber related information.

When required network registration or activation procedures have been completed, UE 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network 719 may further communicate with multiple systems, including a server 760 and other elements (not shown). For example, network 719 may communicate with both an enterprise system and a web client system in order to accommodate various clients with various service levels.

UE 700 preferably includes a microprocessor 738, which controls the overall operation of the device. Communication functions, including at least data communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726. Further, a unique identifier is also preferably stored in read-only memory.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on UE 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the UE 700. These applications will however, according to the above, in many cases need to be approved by a carrier.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of UE 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of UE 700 is similar, except that received signals would preferably be output to a speaker 734 and signals for transmission would be generated by a microphone 736. Alternative voice or audio I/O subsystems, such as a voice message recording subsystem, may also be implemented on UE 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable. Such a port 730 would enable a user to set preferences through an external device or software application and would extend the capabilities of mobile device 700 by providing for information or software downloads to UE 700 other than through a wireless communication network. The alternate download path may for example be used to load an encryption key onto the device through a direct and thus reliable and trusted connection to thereby enable secure device communication.

Alternatively, serial port 730 could be used for other communications, and could include as a universal serial bus (USB) port. An interface is associated with serial port 730.

Other communications subsystems 740, such as a short-range communications subsystem, is a further optional component which may provide for communication between UE 700 and different systems or devices, which need not necessarily be similar devices. For example, the subsystem 740 may include an infrared device and associated circuits and components or a BluetoothlM communication module to provide for communication with similarly enabled systems and devices.

Reference is now made to FIG. 8. FIG. 8 is a block diagram of a communication system 800 that includes a UE 802 which communicates through the wireless communication network.

UE 802 communicates wirelessly with one or multiple Node Bs 806. Each Node B 806 is responsible for air interface processing and some radio resource management functions. Node B 806 provides functionality similar to a Base Transceiver Station in a GSM/GPRS networks.

The wireless link shown in communication system 800 of FIG. 8 represents one or more different channels, typically different radio frequency (RF) channels, and associated protocols used between the wireless network and UE 802. A Uu air interface 804 is used between UE 802 and Node B 806.

An RF channel is a limited resource that must be conserved, typically due to limits in overall bandwidth and a limited battery power of UE 802. Those skilled in art will appreciate that a wireless network in actual practice may include hundreds of cells depending upon desired overall expanse of network coverage. All pertinent components may be connected by multiple switches and routers (not shown), controlled by multiple network controllers.

Each Node B 806 communicates with a radio network controller (RNC) 810. The RNC 810 is responsible for control of the radio resources in its area. One RNC 810 controls multiple Node Bs 806.

The RNC 810 in UMTS networks provides functions equivalent to the Base Station Controller (BSC) functions in GSM/GPRS networks. However, an RNC 810 includes more intelligence, including, for example, autonomous handovers management without involving MSCs and SGSNs.

The interface used between Node B 806 and RNC 810 is an Iub interface 808. An NBAP (Node B application part) signaling protocol is primarily used, as defined in 3GPP TS 25.433 V3.11.0 (2002-09) and 3GPP TS 25.433 V5.7.0 (2004-01).

Universal Terrestrial Radio Access Network (UTRAN) 820 comprises the RNC 810, Node B 806 and the Uu air interface 804.

Circuit switched traffic is routed to Mobile Switching Centre (MSC) 830. MSC 830 is the computer that places the calls, and takes and receives data from the subscriber or from PSTN (not shown).

Traffic between RNC 810 and MSC 830 uses the Iu-CS interface 828. Iu-CS interface 828 is the circuit-switched connection for carrying (typically) voice traffic and signaling between UTRAN 820 and the core voice network. The main signaling protocol used is RANAP (Radio Access Network Application Part). The RANAP protocol is used in UMTS signaling between the Core Network 821, which can be a MSC 830 or SGSN 850 (defined in more detail below) and UTRAN 820. RANAP protocol is defined in 3GPP TS 25.413 V3.11.1 (2002-09) and TS 25.413 V5.7.0 (2004-01).

For all UEs 802 registered with a network operator, permanent data (such as UE 802 user's profile) as well as temporary data (such as UE's 802 current location) are stored in a home location registry (HLR) 838. In case of a voice call to UE 802, HLR 838 is queried to determine the current location of UE 802. A Visitor Location Register (VLR) 836 of MSC 830 is responsible for a group of location areas and stores the data of those mobile stations that are currently in its area of responsibility. This includes parts of the permanent mobile station data that have been transmitted from HLR 838 to the VLR 836 for faster access. However, the VLR 836 of MSC 830 may also assign and store local data, such as temporary identifications. UE 802 is also authenticated on system access by HLR 838.

Packet data is routed through Service GPRS Support Node (SGSN) 850. SGSN 850 is the gateway between the RNC and the core network in a GPRS/UMTS network and is responsible for the delivery of data packets from and to the UEs within its geographical service area. Iu-PS interface 848 is used between the RNC 810 and SGSN 850, and is the packet-switched connection for carrying (typically) data traffic and signaling between the UTRAN 820 and the core data network. The main signaling protocol used is RANAP (described above).

The SGSN 850 communicates with the Gateway GPRS Support Node (GGSN) 860. GGSN 860 is the interface between the UMTS/GPRS network and other networks such as the Internet or private networks. GGSN 860 is connected to a public data network PDN 870 over a Gi interface.

Those skilled in art will appreciate that wireless network may be connected to other systems, possibly including other networks, not explicitly shown in FIG. 8. A network will normally be transmitting at very least some sort of paging and system information on an ongoing basis, even if there is no actual packet data exchanged. Although the network consists of many parts, these parts all work together to result in certain behaviours at the wireless link.

Other embodiments will be apparent to those skilled in the art from consideration of the specification and practice of the subject matter disclosed herein. It is intended that the specification and examples be considered as exemplary only, with a true scope and spirit of the invention being indicated by the following claims.

What is claimed is:

1. A method in a user equipment (UE), the method comprising:
    operating in a Dedicated Channel State (CELL_DCH);
    if circuit-switched and packet-switched radio access bearers exist simultaneously in a connection state and there is a Radio Link Control (RLC) error on at least one Packet Switched (PS) Radio Access Bearer (RAB),
    releasing radio resources of the at least one packet-switched radio access bearer; and
    sending, via the UE after releasing the radio resources, a message comprising data relating to the RLC error to a network equipment and information for the network equipment to release the at least one packet-switched radio access bearer,
    wherein the message includes an information element identifying a cause relating to the RLC error, the message sent to the network equipment does not initiate a cell update procedure, and the message is a Signaling Connection Release Indication (SCRI) message.

2. The method of claim 1, wherein the sending a message occurs while the UE maintains the connection state of the circuit-switched radio access bearer.

3. The method of claim 1, further comprising:
    running a timer indicative of a duration for the UE to wait for the RLC error to be corrected.

4. The method of claim 1, wherein the message is to release all radio access bearers for a Packet Switched (PS) domain active in the UE.

5. The method of claim 1, wherein the cause indicates an RLC unrecoverable error on Radio Bearer 5 (RB5) and up.

6. The method of claim 1, wherein the RLC error is an RLC unrecoverable error.

7. A method in a user equipment (UE), the method comprising:
    identifying at least one packet-switched radio bearer experiencing a Radio Link Control (RLC) unrecoverable error;
    operating in a Dedicated Channel State (CELL_DCH);
    determining if all active radio bearers for the UE are experiencing RLC errors;
    releasing radio resources of the at least one packet-switched radio bearer;
    sending, via the UE after releasing the radio resources, a message comprising an information element identifying a cause relating to the RLC unrecoverable error to a network equipment, wherein:
        if the determining is affirmative, the message is to release all radio access bearers for the UE, the message does not initiate a cell update procedure, and the message is a Signaling Connection Release Indication (SCRI) message, and
        if the determining is negative, the message is for the network equipment to release only the at least one packet-switched radio bearer and the message is a Radio Bearer Release Indication (RBRI) message.

8. The method of claim 7, further comprising, before the sending to the network equipment:
    sending data relating to the RLC unrecoverable error to the network equipment, the data including an identification of the at least one packet-switched radio bearer.

9. The method of claim 7, further comprising, before the sending to the network equipment, determining that a timer has expired and the RLC error remains.

10. A method in a user equipment (UE), the method comprising:
operating in a Dedicated Channel State (CELL_DCH);
determining the existence of a Radio Link Control (RLC) error on at least one packet-switched radio bearer;
sending to a network equipment a reporting message indicative of the RLC error;
running a timer indicative of a duration for the UE to wait for the RLC error to be corrected;
determining that the timer expires and the RLC error is not corrected;
releasing radio resources of the at least one packet-switched radio bearer; and
sending, via the UE after releasing the radio resources, to the network equipment a Signaling Connection Release Indication (SCRI) message with an information element, the information element identifying a cause relating to the RLC error, and the SCRI message does not initiate a cell update procedure.

11. The method of claim 10, wherein the cause is indicative of an RLC unrecoverable error on Radio Bearer 5 (RB5) and up.

12. A User equipment (UE), comprising:
one or more processors configured to cause the UE to:
operate in a Dedicated Channel State (CELL_DCH);
determine if circuit-switched and packet-switched radio access bearers exist simultaneously in a connection state and there is a Radio Link Control (RLC) error on at least one packet-switched radio bearer;
release, in response to the determination, radio resources of the at least one packet-switched radio bearer; and
after releasing the radio resources, send a Signaling Connection Release Indication (SCRI) message to a network equipment while maintaining the connection state of the circuit-switched radio access bearer, wherein the SCRI message includes data relating to the RLC error, the data including an information element identifying a cause relating to the RLC error, and the SCRI message does not initiate a cell update procedure.

13. The UE of claim 12, further comprising:
a timer indicative of a duration for the UE to wait for the RLC error to be corrected.

14. The method of claim 1, wherein the message is to release only the at least one packet-switched radio bearer and provides an identification of the at least one packet-switched radio bearer.

* * * * *